Nov. 13, 1962 M. HEBEL ETAL 3,063,628
INFORMATION TRANSFERRING APPARATUS FOR ACCOUNT CARDS
Filed Nov. 12, 1958 6 Sheets-Sheet 1

INVENTORS
MARTIN HEBEL
MARTIN HEBEL
BY
MICHAEL S. STRIKER
ATTORNEY

INVENTORS
MARTIN HEBEL
MARTIN HEBEL
BY
MICHAEL S. STRIKER.
ATTORNEY.

Nov. 13, 1962    M. HEBEL ETAL    3,063,628
INFORMATION TRANSFERRING APPARATUS FOR ACCOUNT CARDS
Filed Nov. 12, 1958    6 Sheets-Sheet 4

FIG. 5

INVENTORS
MARTIN HEBEL
MARTIN HEBEL
BY
MICHAEL S. STRIKER.
ATTORNEY.

Nov. 13, 1962 M. HEBEL ETAL 3,063,628
INFORMATION TRANSFERRING APPARATUS FOR ACCOUNT CARDS
Filed Nov. 12, 1958 6 Sheets-Sheet 5

INVENTORS
MARTIN HEBEL
MARTIN HEBEL
BY
MICHAEL S. STRIKER.
ATTORNEY.

FIG. 9

INVENTORS
MARTIN HEBEL
MARTIN HEBEL
BY MICHAEL S. STRIKER
ATTORNEY.

United States Patent Office 3,063,628
Patented Nov. 13, 1962

3,063,628
INFORMATION TRANSFERRING APPARATUS FOR ACCOUNT CARDS
Martin Hebel, Hechendorf am Pilsensee, and Martin Hebel, Nurnberg, Germany, assignors to Max Grundig, Furth, Bavaria, Germany
Filed Nov. 12, 1958, Ser. No. 773,451
Claims priority, application Germany Nov. 15, 1957
20 Claims. (Cl. 235—61.9)

The present invention refers to an information transferring apparatus for account cards, and more particularly to an apparatus which is used in a business machine, such as an accounting machine, for the purpose of recording a balance, or other numerical value, on a card having a magnetizable part, and for transferring information recorded on a card to another card during the insertion of the card into a business machine, and during the ejection of the card from the business machine. According to known apparatus of this type, a numerical value computed in a business machine, for example a balance, is recorded on a magnetizable layer on an account card in the form of coded impulses, and the recorded impulses are sensed at the beginning of the following accounting operation and is transferred into the computing devices and to the printing device of the business machine.

The apparatus according to the known art has the disadvantage that at the beginning of an accounting operation at a time when the account card is already inserted into the machine, and after the completed accounting operation before the account card is removed from the machine, an additional relative movement between the account card and the transducer heads is required for the recording and sensing operations. This requires not only additional devices for producing and controlling the relative movement, but also extends the time required for each accounting operation. Furthermore, in accordance with the prior art, account cards having a magnetizable layer, or account cards consisting of a magnetizable material are used which limits the usefulness of the arrangement, since the space available on the account cards for printing is reduced. Moreover, the rear face of the account card cannot be used at all for magnetic recording operations.

It is one object of the present invention to provide an information transferring apparatus for account cards which overcomes the disadvantages of the prior art.

Another object of the present invention is to provide an information transferring apparatus for account cards which uses the time required for insertion and ejection of account cards for transferring information between account cards.

Another object of the present invention is to provide an account card which includes a magnetizable record carrying plate which is detachable, and can be used on the rear face of the same card, or on another card.

Another object of the present invention is to provide an information transferring apparatus for account cards which includes a storage means for storing temporarily information taken from one account card during its insertion so that the thus stored information can be recorded on another card during ejection of the same from the business machine.

Another object of the present invention is the provision of card positioning means which transport record carrying cards during insertion and ejection, and to couple turnable storing means with the positioning means so that information is stored during the movement of the positioning means with the record carrying card.

A further object of the present invention is to provide an electronic storage device which is controlled by control impulses recorded on the record carrying card.

With these objects in view, the present invention mainly consists in an information transferring apparatus for record carriers, such as account cards, and comprises carriage means including positioning means for moving record carriers to and from an operative position; transducer head means for recording impulses and for sensing recorded impulses on record carriers transported by the positioning means; storage means for storing impulses; and control circuit means connecting the transducer head means with the storage means for effecting during movement of the positioning means sensing and recording of impulses on record carriers moved by the positioning means.

In accordance with a preferred embodiment of the present invention, control means mounted on the carriage means operate control switches associated with columns of the record carrier for initiating operations desired in selected columns.

In accordance with one embodiment of the present invention the storage means include a magnetizable drum turning in synchronism with the positioning means, and a main storage device in which impulses are introduced to represent numerical values. According to another embodiment of the present invention, an electronic storage device is provided which is operated by impulses recorded on the record carrier.

An account card according to the present invention consists of a paper card to which a magnetizable plate having the size of a postage stamp is adhesively attached. When one face of the card is filled with printed information, the record carrying plate can be detached, and adhesively attached to the other face of the card. When both faces are imprinted, the magnetizable plate can be transferred to another new card.

The storing of the numerical values is preferably carried out in accordance with a binary coded decimal system in which each digit is represented by a set of binary impulses. The orders of the numbers are successively recorded, sensed, and stored.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
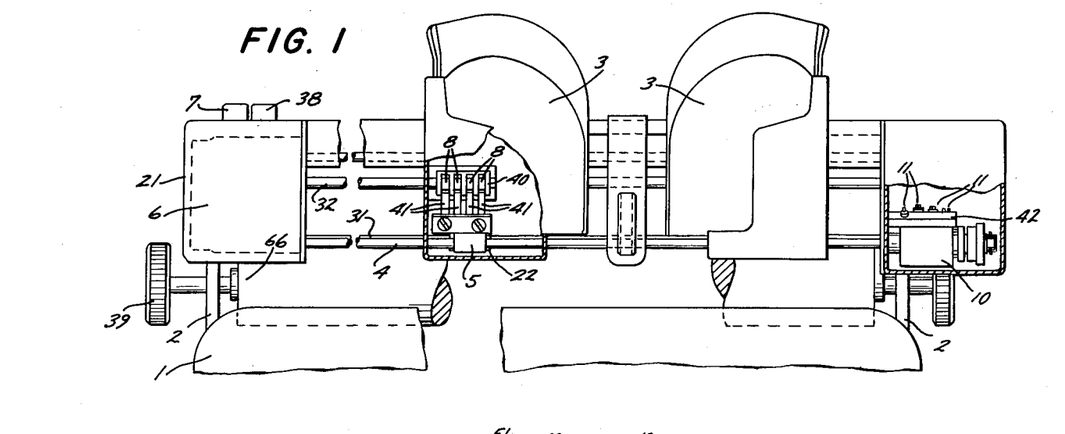
FIG. 1 is a fragmentary front view of a business machine illustrating a carriage provided with an apparatus according to one embodiment of the present invention.
Figure 2:
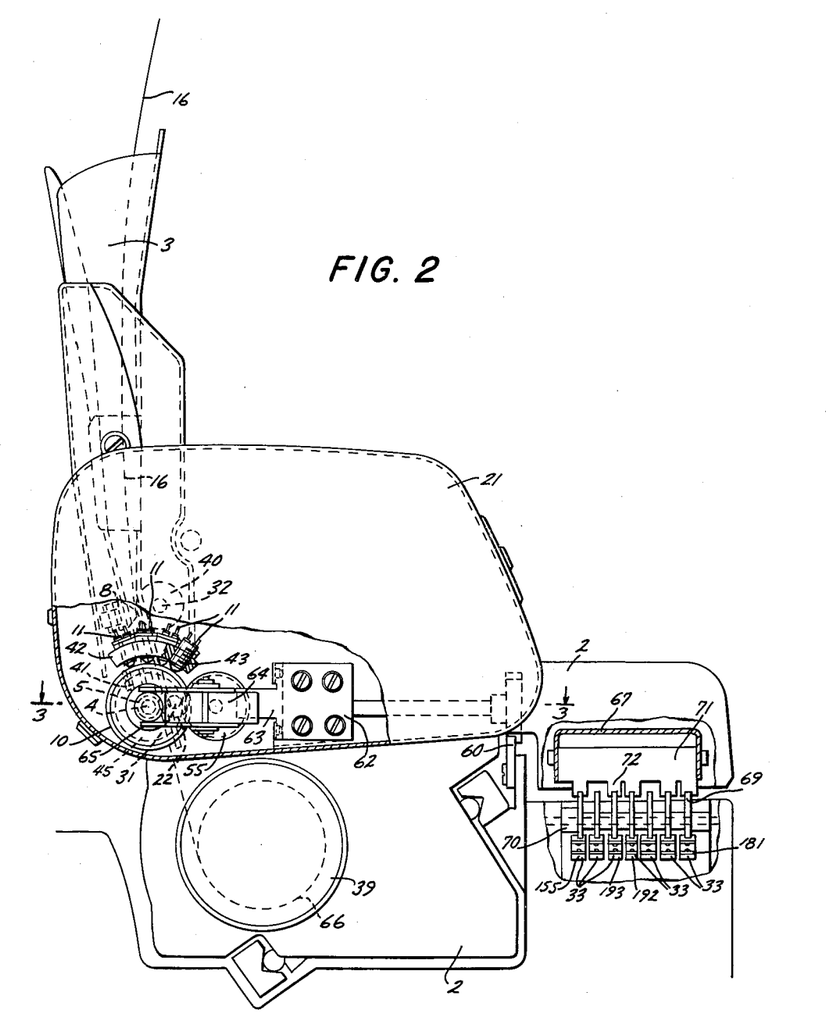
FIG. 2 is a fragmentary side view of the arrangement shown in FIG. 1, partly shown in section.

Referring now to the drawings, and more particularly to FIGS. 1 and 2, a carriage 2 is movably mounted on the supporting means 1 of a business machine and is provided with an automatic, or semi-automatic, positioning means for account cards by which inserted account cards are moved to an operative position, and again ejected after completion of the accounting operation. The positioning means include a frame 21, a holding pocket 3, a drive motor 6, shafts 4, 31, 32, and transporting rolls 5, 22, which are respectively secured to shafts 4 and 31 and resiliently engage the account cards. When shafts 4, 31 are turned by motor 6, the account card 16 is transported.

Figure 4:
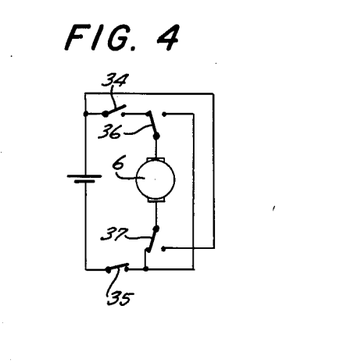
FIG. 4 is a diagram illustrating the motor circuit.
Figure 6:
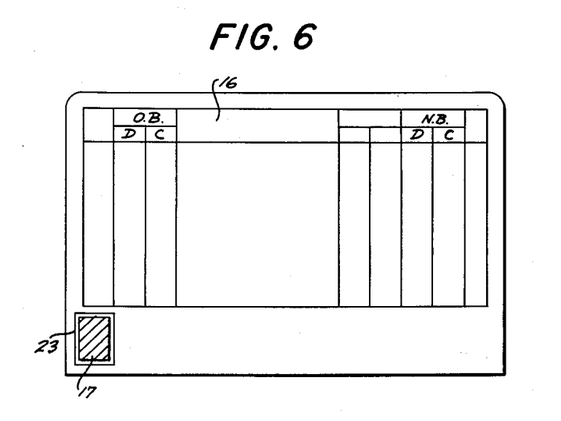
FIG. 6 is a front view of a record carrier card according to the present invention.

At the beginning of an accounting operation, the account card 16, which is shown in detail in FIG. 6, is inserted into the pocket 3, and when button 7 is operated, switch 34 is closed, see FIG. 4, and motor 6 turns shafts 4 and 31 to insert the account card. A suitable mark is provided on the first free line of the account card, which is sensed in a conventional manner whereby a switch 35 is opened in the motor circuit so that motor 6 is stopped and the card is held in an operative position in which printing means may print on the free line.

After termination of the accounting operation, a new mark is made on the next following free line in a conventional manner, not shown, and during the return movement of the carriage to its initial position, the switches 36, 37 are actuated so that motor 6 is reversed and drives rolls 5 and 22 in opposite direction whereby the card is ejected. Switches 36 and 37 can be also actuated by a manually operated button 38, if ejection of the account card during an accounting operation is desired. The speed at which the account card is transported is the same during insertion and ejection.

This arrangement is not an object of the present invention, and the insertion and ejection of the account card can be also obtained by manually operated lever acting through transmission means on rollers 5 and 22 and being spring loaded for effecting ejection of the account card.

A set of transducer head means 8 is mounted on the pocket portion 3 of the positioning means and are urged by leaf springs 41 against a roller 40 mounted on shaft 32. Account cards 16 which are inserted into the pocket 3, move between the transducer head means 8 and the roller 40 toward the platen 66.

Shaft 4 also carries a drum 10 which has a magnetizable surface and cooperates with four transducer heads 11 supported on a support 42 on the carriage means, and being spaced in circumferential and axial direction of drum 10. The transducer heads 11 are provided with an outer thread engaging a corresponding thread in the support 42 so that the position of transducer heads 11 may be adjusted to the desired distance from the surface of drum 10.

Storage drum 10 can be turned in steps, or continuously rotated by shaft 4.

Figure 3:
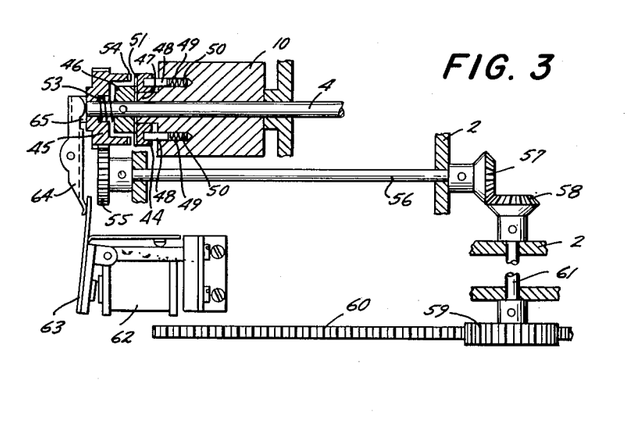
FIG. 3 is a sectional view taken on line 3—3 in FIG. 2.

As shown in FIG. 3, a coupling means is provided for this purpose, and includes a ring 44 which is axially shiftable on a guide portion 47 of drum 10, and is provided with pins 48 projecting into matching bores 49 of drum 10. Springs 50 are located in bores 49, and urge ring 44 against a ring 46 which is fixedly secured to shaft 4. Suitable teeth or fingers 51 are provided on the coupling rings 44 and 46 so that drum 10 is normally coupled to shaft 4 and rotated by the same when motor 6 turns shaft 4.

A gear 45 is mounted on shaft 4 freely turnable and shiftable in axial direction. Gear 45 has projecting coupling fingers 54 which also cooperate with the coupling fingers 51 on ring 41 when gear 45 is shifted in axial direction against the action of spring 53. When coupling gear 45 is shifted to the right as viewed in FIG. 3, it also shifts coupling ring 44 against the action of springs 50 so that the coupling fingers 51 on coupling ring 44 release the corresponding coupling fingers on ring 46. In this way, the drum 10 is no longer driven by shaft 4, but is driven by gear 45.

Gear 45 meshes with a gear 55 which is connected by shaft 56 to a pair of bevel gears 57 and 58. Bevel gear 58 is connected by shaft 61 to a pinion 59 which meshes with a rack bar 60 which is secured to the supporting frame means of the machine. Since shafts 56 and 61 are mounted on the carriage means 2, stepwise movement of the carriage means during a conventional printing operation results in stepwise turning of gears 45, 55, 57, 58 and 59 so that drum 10 moves stepwise when coupled to gear 45. The ratio of the transmission means between rack bar 60 and gear 45 is so chosen that the stepwise angular displacement of the surface of drum 10 is sufficient to permit the distinguishable recording of impulses by transducer heads 11 on the magnetizable surface of drum 10.

The shifting of coupling part 45, 54 is effected by an electro-magnetic means 62 whose armature 63 operates a lever 64 engaging coupling part 45, 54 by projecting portions 65. When electro-magnetic means 62 is energized, the armature 63 is attracted, and lever 64, 65 urges coupling means 45, 54 against the action of spring 53 into a coupling position in which drum 10 is stepwise moved and disconnected from the continuously rotating shaft 4.

The machine is provided with control means for effecting desired operations in selected positions of the carriage means 2. As shown in FIG. 2, a control bridge is fixedly secured to the carriage means 2 and is provided with control elements 71 which are respectively associated with carriage positions. Control elements 71 are exchangeable, and have differently arranged control projections 72 cooperating with other control elements 69 which are turnably mounted on a stationary shaft 68 which is supported on the stationary supporting means 1 of the machine. A set of switches 33 is located, respectively, underneath the control elements 69, and are operated by the same when selected control elements 69 are turned by projections 72 during the carriage movement. In each column position of the carriage means 2 different combinations of projections are provided on the respective control elements 71 so that different combinations of switches 33 are actuated. Switches 33 are connected into control circuit means by which the operations of the machine, and particularly the motions of the carriage means are controlled. Each switch 33 is maintained in closed position as long as carriage 2 stops in the respective column position. While the number of control elements 71 generally corresponds to the number of required control operations, it is possible to provide so many control elements 71 that control operations are initiated every time the carriage moves one step in writing or return direction.

This arrangement is not an object of the present invention, and is, for example, described in the U.S. Patent 2,364,758. However, when the present invention is applied to this arrangement, switches 155, 181, 192, and 193 are provided which correspond to switches 33, but are elements of the circuit of the present invention.

Figure 5:
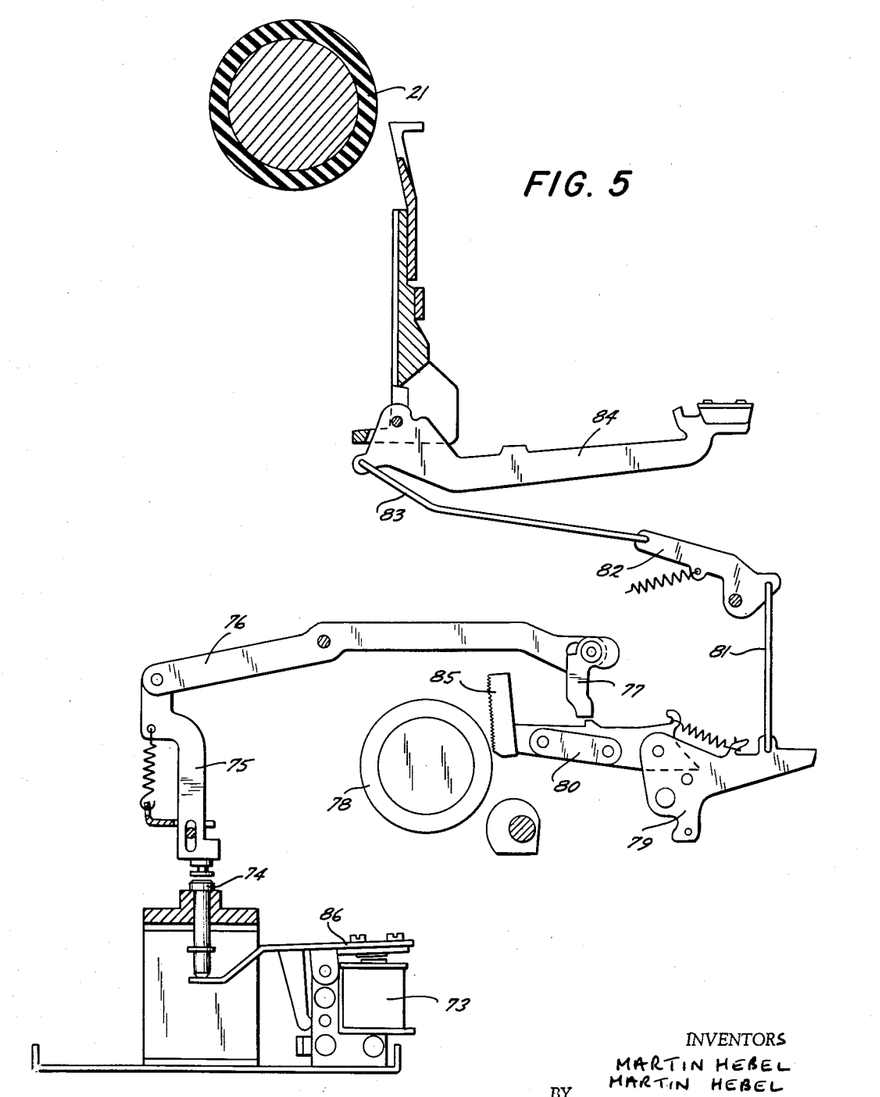
FIG. 5 is a fragmentary side view illustrating the printing means of the machine.

The accounting machine is further provided with electrically controlled printing means of the type provided in electric typewriters. FIG. 5 illustrates an arrangement of printing means which may be used in the machine of the present invention. An electro-magnetic means 73 operates, when energized, a lever system 75, 76, 77 which acts on a lever 80 so that a friction member 85 is urged against a rotary drum 78. When drum 78 engages friction member 85, lever 80 turns lever 79 which acts through a linkage 81, 82, 83 on the type lever 84 to move it rapidly toward platen 21. Printing means as shown in FIG. 5 are positioned opposite the carriage means 2, and the type levers 84 are so located that they will produce imprints on the first free line of an inserted account card held by the positioning pocket 3.

As shown in FIG. 6, the account card which is used in the arrangement of the present invention has a large free portion for receiving printed information. A small space near the lower edge of card 60 is indicated by an outline 23. A magnetizable plate 17, which may be flexible, is adhesively secured to the area bounded by line 23. Plate 17 has a size of a large postage stamp, and may consist of paper, synthetic material, or of any suitable substance which is either magnetizable, or provided with a layer of magnetizable material. Preferably, a pressure sensitive adhesive is used so that the magnetizable record carrier 17 can be attached by pressure, and again pulled off, when the available space on card 16 has been filled. Thereupon, the magnetizable record carrier 17 can be attached to the rear side of card 16, and after that to another card since record carrier 17 can be used for many more recordings than space is available on the account cards.

The record carrier 17 cooperates with the previously described transducer heads 8 which are mounted on the pocket means 3 of the positioning means. In the embodiment of FIG. 1, four transducer heads 8 are provided which permits the recording and sensing of digits in a binary coded decimal system. Each digit can be expressed by four digit elements. If a voltage is supplied to one of the transducer heads 8, an impulse will be recorded, and otherwise no impulse will be recorded by the respective transducer heads. Thereby, combinations of recorded impulses represent the respective digit. When a line of impulses is sensed simultaneously by the row of transducer heads 8, corresponding impulses are produced in the transducer heads which sense recorded impulses.

Figure 7:
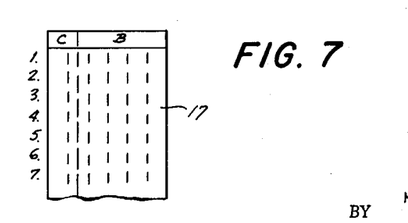
FIG. 7 is a schematic table illustrating possible positions of impulses recorded on the record carrier.

Each order of a number is represented by a line of coded impulses on the record carrier 17, and portion B of FIG. 7 shows the arrangement of such lines. However, it will be understood that normally not all columns of the portion B will have recorded impulses, since different digits will be represented in the different orders. The column C is not used in the embodiment of FIG. 1. The transducer heads 8 are provided in a conventional manner with erasing means so that a previously recorded impulse is erased whenever a new impulse is recorded.

Figure 8:
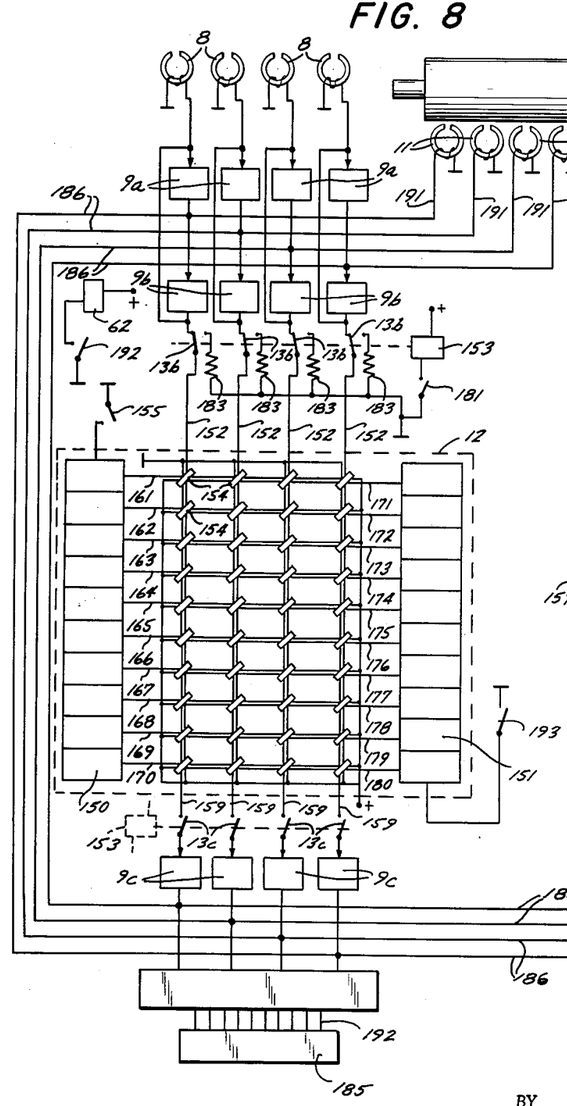
FIG. 8 is a diagram illustrating the circuit of the apparatus according to the embodiment of FIG. 1.

As best seen in FIG. 8, the transducer heads 8 are connected by control circuit means to the transducer heads 11 of storage device 12, and also to a storage device 12. Storage device 12 is of the type employing magnetic cores 154 having a rectangular hysteresis characteristic so that cores 154 can be placed in two different stable magnetic conditions. The two conditions of the magnetic cores 154 can be used for a binary representation of numerical values.

Each magnetic core 154 requires a predetermined saturation current for being shifted between the two magnetic conditions thereof. Each core 154 is provided with two windings. Half the saturation current flows through each winding so that currents must flow in both windings of a magnetic core 154 to shift the same from one condition thereof to the other condition thereof. If current flows only in one winding, the magnetic condition of the respective cores is not changed. The storage device 12 shown in FIG. 8 is provided with a plurality of lines of four magnetic cores 154 capable of representing binary coded decimal digits. A plurality of lines is provided which are respectively associated with the decimal orders. The magnetic cores 154 of each line are respectively provided with a first set of windings connected in series and designated by the reference numerals 161 to 170. Each column of magnetic cores 154 is provided with a second set of windings connected in series and designated by the reference numeral 152. Only if both windings of a magnetic core 154 are energized, the condition of the respective core is switched.

Electro-mechanic stepping mechanisms 150, and 151 are provided for successively operating the orders of the storage device 12. The stepping mechanism 150 has ten counting elements which are respectively connected to the set of windings 161 to 170. Every time a switch 155, which is one of the switches 33 shown in FIG. 2, is closed by a control element 67 in a carriage position associated with the printing of the respective decimal order, the stepping mechanism 150 is shifted to the next position, in which a different series of windings 161 to 170 is supplied with half the current necessary for saturation of the magnetic cores, and for shifting of the condition of the respective magnetic core. The stepping mechanism 150 is connected as a ring circuit so as to assume its initial position after the eleventh impulse provided by switch 155.

Figure 10:
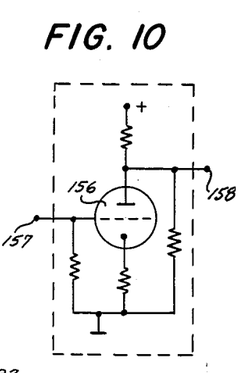
FIG. 10 is a diagram illustrating the circuit of an amplifier used in the apparatus.

Numerical values may be stored in storage device 12 in two ways. Either recorded impulses are sensed by transducer heads and supplied to the input windings 152 to the storage device 12, or impulses are supplied through conductors 186 from the computing devices of the machine to the amplifiers 9b which are constructed as shown in FIG. 10, and include a triode 156, a grid input 157, and an anode output 158. Impulses appearing on the output of the amplifier are stored in the magnetic cores 154 of the line in which the windings 161—170 are respectively energized. In this manner, all ten orders of a number are stored starting from the highest order while the drum 10 moves step by step driven by transmission 45 to 61 during stepwise carriage movement. The stepwise carriage movement also effects consecutive energization of windings 161 to 170 during such movement of the carriage, since consecutive control elements 71 become effective.

Output windings 159 are wound about columns of cores 154 in the same manner as the input windings 152. For transferring a numeral value stored in storage device 12, a switch 181, which is one of the switches 33, is closed in the respective column of the account card by a control element 71. When switch 181 is closed, relay 153 is energized and actuates switches 13b and 13c. In this manner, the input windings 152 are connected through resistors 183 to ground potential so that in the column windings 152 a current flows. At the same time the output windings 159 are connected to the inputs of amplifiers 9c whose outputs are connected to the calculating devices of the machine by conductors 186, and to the input of a de-coding device 184. A de-coding device of this type is described in the publication "Synthesis of Electronic Computing and Control Circuits," Harvard University Press. The ten output lines 192 of the decoding device 184 are respectively connected to the electro-magnetic means 73 of the printing means described with reference to FIG. 5 so that corresponding decimal digits can be printed on the account card. If in this condition switch 155 is closed by the moving carriage 2, the stepping mechanism 150 is operated so that a number stored in the storage device 12 is transferred in the form of consecutive impulses to the electro-magnetic means 73 whereby the number is printed, and is also simultaneously transferred through lines 186 to the calculating means of the machine.

Numerical values computed in the calculating devices of the machine are introduced into storage device 12 through lines 186 in the same manner as described with reference to the input of values from the storage drum 10.

Printing means 185 can be operated simultaneously with the introduction of a numerical value into storing device 12 from the calculating devices of the machine.

A new numerical value stored in storage device 12 is transferred to the storage drum 10 by operation of the second stepping mechanism 151. Stepping mechanism 151 serves for reversing the order of the decimal orders while the numerical value is recorded on drum 10. A switch 193 of the set of switches 33 is closed by the respective control element 71, and effects operation of the stepping mechanism 151. When switch 181 is closed by a control element 71, relay 153 is energized, and the stored numerical value is transferred from storage device 12 through conductors 191 to the transducer heads 11 which record the impulses starting from the lowest order on drum 10. During transfer of impulses from storage device 12 to drum 10, a switch 192 of the set of switches 33 is closed by the respective control element 71 so that an electro-magnetic means 62 is energized which effects coupling of drum 10 with the carriage for stepwise movement, as described with reference to FIG. 3.

The apparatus operates in the following manner:

Assuming that a new balance has been computed in the machine, impulses representing the new balance in a binary coded decimal system are introduced through lines 186 into storage device 12. At the same time, printing means 185 print the new balance on the first free line of the account card 60. The carriage moves in writing direction during this operation, and every time a switch 155 of the switches 33 is actuated during the stepwise movement of the carriage, the stepping mechanism 150 is shifted one step. The arriving impulses are amplified in amplifiers 9b and pass through windings 152 so that the respective numerical value is stored order by order in storing device 12, while the printing means print the corresponding digits. As explained above, storing in the magnetic cores 154 takes place only if currents flow simultaneously through the respective windings 152, and through one of the windings 161 to 170. Control elements 71, 72 effect during stepwise movement closing of the respective switches 33 which control electromagnetic means 73 so that the corresponding digits are printed by the printing means shown in FIG. 5.

After storing in storing device, and printing of the new balance, has been completed, switch 193 of switches 33 is closed by a control element 71, 72 during further movement of the carriage in writing direction so that the stepping mechanism 151 becomes operative. Switch 181 of switches 33 is closed, relay 153 is energized, so that switches 13b and 13c are closed. The stepping mechanism 151 operates in reverse direction so that the digits of the orders stored in storing device 12 are transferred in reversed order through lines 191 to transducer heads 11 which record on the storage drum 10. Consequently, the respective numerical value is recorded on storage drum 10 starting with the lowest order. Switch 192 of switches 33 is closed by the respective control element 71, 72 so that the coupling means 45, 44, 46 are in the coupling position in which storage drum 10 moves stepwise during stepwise movement of the carriage. The radius of drum 10 is so chosen that its circumference is wide enough to permit proper spacing of the recorded impulses associated with the different orders. In the present embodiment, ten orders are stored on the circumference of drum 10.

When the carriage has moved beyond the column containing the balance and arrives in its terminal position, control elements 71, 72 permit opening of switch 192 so that electro-magnetic means 62 is de-energized, and the coupling means 45 moves to its other position whereby coupling elements 46, and 44 are coupled. In this coupling position, storage drum 10 is continuously rotated by shaft 4. A suitable switch of switches 33 effects in the terminal position of the carriage return movement of the carriage, and since switches 36, 37 are actuated during return movement of the carriage, motor 6 is reversed, and the account card is ejected by rotation of the rollers 5, 22. During turning of drum 10, transducer heads 11 sense the recorded impulses on drum 10, and such impulses are amplified by amplifiers 9a and recorded by transducer heads 8 on the record carrier 17 which traverses transducer heads 8 during ejection of the account card. Preferably, the peripheral speed of drum 10 is made equal to the speed of movement of record carrier 17 during ejection.

The ejected card contains the new balance printed thereon, and also the new balance recorded in the form of coded impulses on the record carrier 17. In this manner, numbers which periodically occur during several accounting operations, for example the account number and a balance, can be recorded on the record carrier 17.

No distinction is made between different data when the information is transferred between record carrier 17 and storage means 10 and 154 of the accounting machine. The orders of each numerical value directly follow the orders of the preceding value, the sequence remaining the same.

Devices for counting the orders of the numerical values are provided in the accounting machine so that an account number and a balance can be identified by counting, for example, the constant number of orders of the account number. This arrangement is not an object of the present invention.

The storage means 10 and 154 must have a capacity sufficient for storing all transferred values. Therefore, the storage means 10 and 154 may have to be designed for a greater number of orders than illustrated in the drawings.

Assuming that it is desired to enter another amount on the account card 16, it will be necessary in accordance with conventional accounting operations to transfer the balance from the balance column to another column of the account card, and to place the new entry underneath it in the same new column.

The account card is inserted into the positioning means, and automatically placed in a position in which the first free line is opposite the printing means. The old balance is recorded on the record carrier 17, and is sensed by transducer heads 8 during the inserting operation which results in movement of the record carrier 17 past the transducer heads 8. The impulses are amplified by amplifiers 9a, and transferred by transducer heads 11 to the storage drum 10 which turns in synchronism with the positioning rollers 5, 22.

The carriage moves to the column in which the old balance is to be printed, and in this column, control elements 71, 72 actuate the switch 33 associated with electromagnetic means 62 so that storage drum 10 is coupled by coupling means 45, 44 to shaft 56 and pinion 59 resulting in stepwise movement of drum 10 during the stepwise movement of carriage 2. During such stepwise movement of drum 10, the impulses stored on drum 10 and representing the old balance are sensed by transducer heads 11, and introduced through amplifiers 9b into the storage device 12, and into the computing devices of the machine. The printing means 185 may be simultaneously actuated to print the old balance in the new column. A new entry can now be made in the new column underneath the old balance.

Figure 9:
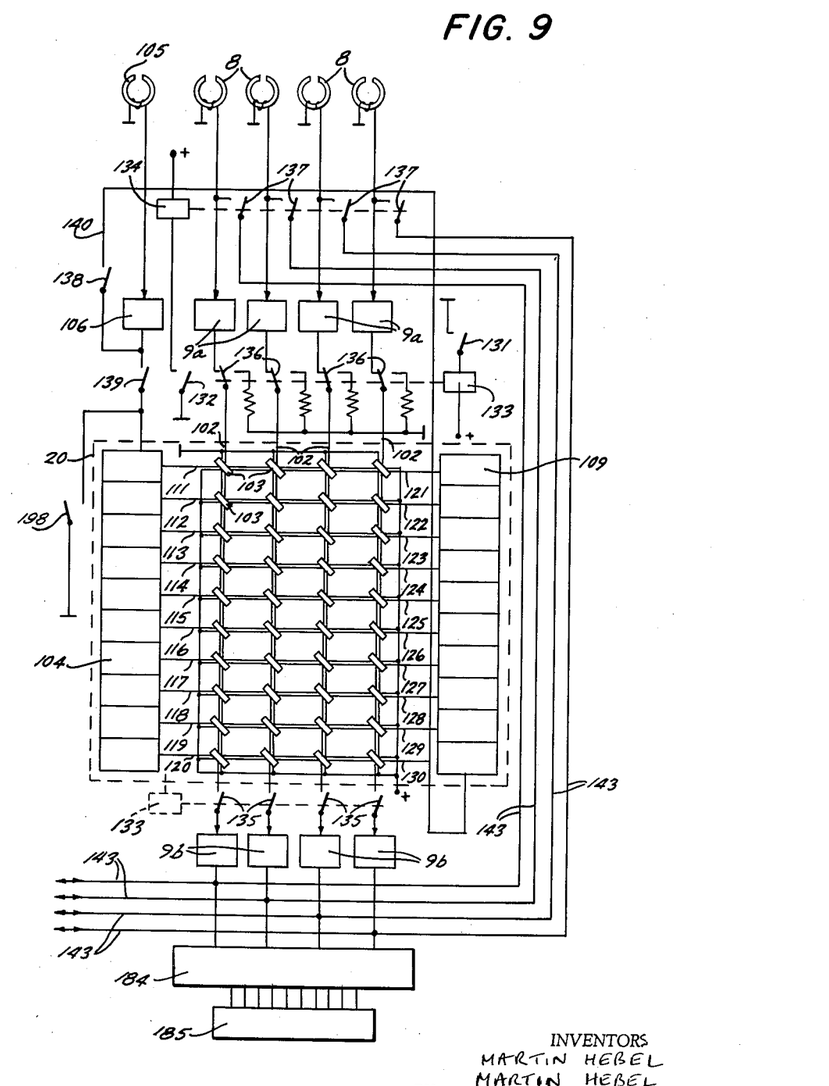
FIG. 9 is a diagram illustrating the circuit of the apparatus according to another embodiment of the present invention.

In the embodiment described with reference to FIGS. 1 to 10, the storage drum 10 is used as an intermediate storing means. In accordance with a modified embodiment of the present invention, a single electronic storage device is provided in place of the storage device 12 and the storage drum 10. This embodiment is shown in FIG. 9 in a diagrammatic view, and it will be understood that the carriage and positioning means, as well as the record carrier are constructed in the manner illustrated in FIGS. 1, 2, 6 and 7. Switches 131, 132, and 198 whose function will be described hereinafter correspond to switches 33 shown in FIG. 2, and are controlled by the carriage.

The electronic storage device 20 shown in FIG. 9 permits an adaptation of the operations to the fact that the input and output speed of an electro-mechanical calculating device is substantially smaller than the input and output speed which can be obtained by a transducer head cooperating with a magnetizable record carrier. The storage device 20 used in the embodiment of the present invention illustrated in FIG. 9 is constructed similarly to the storage device described with reference to FIG. 9. It is, however, not controlled by a mechanically driven storage drum, but by impulses recorded on the record carrier 17.

The impulses representing numbers in a binary coded decimal system in the area B of the record carrier as shown in FIG. 7, are introduced into the storage device 20 as described with reference to the storage device 12. Impulses pass through amplifiers 9a, and reach the windings 102 of the magnet cores 103. The impulse currents are only half the current required for switching the magnetic cores 103, so that additional currents passing through windings 111 to 120 are required for storing a coded digit element in one of the magnet cores 103.

Since a higher speed is required, electronic ring counters 104, 105 are provided. Ring counters of this type are known, and for example described in the book "Synthesis of Electronic Computing and Control Circuits," Harvard University Press. The ring counters are controlled by control impulses provided on the record carrier 17 in the area C as shown in FIG. 7. A control transducer head 105 is provided which cooperates with the impulses recorded in the area C. Consequently, the control impulses are sensed at the same time by control head 105 as the digit representing impulses are sensed by heads 8.

The control impulses sensed by control head 105 are amplified by amplifier 106 and control the ring counter 104 which is switched step by step whenever an impulse reaches it from transducer head 105. As explained above, with reference to FIG. 8, currents corresponding to half the saturation current of the magnetic cores 103 are successively produced in the windings 111 to 120. Whenever current passes through windings 102, impulses are stored in the magnetic cores 103 only when an impulse current flows in one of the lines 111 to 120. Consequently, the impulses recorded in area C of the record carrier will effect the successive operation of the decimal orders of the storage device 20.

The transfer of impulses representing numerical values from storage device 20 to the printing device 185 and to the calculating devices of the machine takes place in the same manner as described with reference to the storage device 12. A switch 198 of switches 33, and a relay 133 corresponding to relay 153 of FIG. 8 shifts switches 135, 136, 137 to effect transfer of the stored impulses.

Numerical values computed in the calculating devices of the machine are introduced into storage device 20 as described after a switch 132 of switches 33 was actuated by control element 71, 72 and has energized a relay 134. Thereby, switches 137 are closed, and lines 143 are connected to the inputs of amplifiers 9a. The order control of the storage device 20 is again effected by switch 198 of switches 33.

The transfer of new numerical values from storage device 20 to the record carrier 17 takes place during the ejection of the account card while the record carrier 17 passes the transducer heads 8 and 105. The transfer is controlled by the permanently stored impulses in the area C of the record carrier 17 together with the ring counter 109. The ring counter 109 actuates the storage device in reversed order of the decimal orders so that the digit order required for recording is obtained.

In the last column, the respective control element 71, 72 closes switches 131, 132 of switches 33 so that relays 133, 134 are again energized, and switches 135, 136, 137 and 138 are closed, while switch 139 is opened. When the first recorded impulse of the area C passes control head 105, an impulse is produced which passes through amplifier 106, switch 138, and line 140 to the ring counter 109 and switches the same to its first position. The winding 130 is energized, and corresponding impulses are produced in the output winding which are amplified in amplifiers 9b and pass through lines 143 to the transducer heads 8 which record corresponding impulses on record carrier 17. The second impulse produced by the second recorded impulse in area C switches ring counter 109 to its next position so that winding 129 is energized and the respective line of the magnetic cores is read out. In this manner, the windings 130 to 121 are successively energized to transfer impulses representing the respective stored number to the record carrier 17. From the above description of two embodiments of the present invention, it will become apparent that the storage means 10, 12 of the embodiment of FIG. 8, and the storage means 20 of the embodiment of FIG. 9 are controlled by the control circuit means described with reference to these figures to connect the transducer heads 8 with the storage means in such a manner as to effect during movement of the positioning means 4, 22 in inserting direction sensing of impulses recorded on record carrier 17, and storing of the impulses in the storage means. During movement of the positioning means in ejecting direction, impulses stored in the storage means are recorded on record carrier 17.

It will be understood that each of the elements described above, or two or more together, may also find a useful application in other types of accounting machines differing from the types described above.

While the invention has been illustrated and described as embodied in an information transferring apparatus for account cards, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine of the type described, in combination, carriage means including positioning means for record carriers, said positioning means being movable in an inserting direction and in an ejecting direction for transporting record carriers to and from an operative position; transducer head means for recording impulses and for sensing recorded impulses on record carriers transported by said positioning means; storage means for storing impulses; and control circuit means connecting said transducer head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means.

2. In a machine of the type described, in combination, carriage means including turnable positioning means for record carriers, said positioning means being turnable in an inserting direction and in an ejecting direction for moving record carriers to and from an operative position; stationary supporting means supporting said carriage means for movement in writing and return directions; transducer head means for recording impulses and for sensing recorded impulses on record carriers transported by said positioning means; storage means for storing impulses; first control means mounted on said carriage means, and second control means mounted on said supporting means and cooperating with said first control means during movement of said carriage means, one of said control means including a plurality of first control elements respectively associated with positions of said carriage means, and the other of said control means including a plurality of second control elements movable to and from an operative position under the control of said first control elements; and control circuit means connecting said head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means, said control circuit means including a set of control switches respectively operated by said second control elements in operative positions.

3. In a machine of the type described, in combination, carriage means including positioning means for record carriers including a writing portion and a magnetizable portion, said positioning means being movable in an inserting direction and in an ejecting direction for transporting record carriers to and from an operative position; transducer head means for recording impulses and for sensing recorded impulses on said magnetizable portion of record carriers transported by said positioning means; printing means for printing on said writing portion of said record carriers; storage means for storing impulses; input means for introducing impulses representing numerical values into said storage means; means for actuating said printing means to print values introduced by said input means into said storage means; and control circuit means connecting said transducer head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means.

4. In a machine of the type described, in combination, carriage means including turnable positioning means for record carriers including a writing portion and a magnetizable portion, said positioning means being turnable in an inserting direction and in an ejecting direction for moving record carriers to and from an operative position; stationary supporting means supporting said carriage means for movement in writing and return directions; transducer head means for recording impulses and for sensing recorded impulses on said magnetizable portion of record carriers tansported by said positioning means; printing means for printing on said writing portion of said record carrier; storage means for storing impulses; input means for introducing impulses representing numerical values into said storage means; means for actuating said printing means to print values introduced by said input means into said storage means; first control means mounted on said carriage means, and second control means mounted on said supporting means and cooperating with said first control means during movement of said carriage means, one of said control means including a plurality of first control elements respectively associated with positions of said carriage means, and the other of said control means including a plurality of second control elements movable to and from an operative position under the control of said first control elements; and control circuit means connecting said head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means, said control circuit means including a set of control switches respectively operated by said second control elements in operative positions.

5. In a machine of the type described, in combination, carriage means including positioning means for record carriers, said positioning means being movable in an inserting direction and in an ejecting direction for transporting record carriers to and from an operative position; transducer head means for recording impulses and for sensing recorded impulses on record carriers transported by said positioning means, and including means for erasing recorded impulses before recording new impulses; storage means for storing impulses; and control circuit means connecting said transducer head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means.

6. In a machine of the type described, in combination, carriage means including positioning means for record carriers, said positioning means being movable in an inserting direction and in an ejecting direction for transporting record carriers to and from an operative position; transducer head means for recording impulses and for sensing recorded impulses on record carriers transported by said positioning means, said transducer head means including a set of recording and sensing transducer heads respectively associated with coded digit elements representing decimal digits coded in a binary coded decimal system, and a control head for sensing control impulses; storage means for storing impulses; and control circuit means connecting said transducer head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means.

7. In a machine of the type described, in combination, carriage means including turnable positioning means for record carriers, said positioning means being turnable in an inserting direction and in an ejecting direction for moving record carriers to and from an operative position, said carriage being movable in a stepwise movement; stationary supporting means supporting said carriage means for movement in writing and return directions; transducer head means for recording impulses and for sensing recorded impulses on record carriers transported by said positioning means, said transducer head means including a set of recording and sensing transducer heads respectively associated with coded digit elements representing decimal digits coded in a binary coded decimal system, and a control head for sensing control impulses; storage means for storing impulses; first control means mounted on said carriage means, and second control means mounted on said supporting means and cooperating with said first control means during movement of said carriage means, one of said control means including a plurality of first control elements respectively associated with positions of said carriage means, and the other of said control means including a plurality of second control elements movable to and from an operative position under the control of said first control elements; and control circuit means connecting said head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means, said control circuit means including a set of control switches respectively operated by said second control elements in operative positions, said control circuit means including circuit means connecting said control head with said storage means for actuating said storage means order by order during turning movement of said positioning means.

8. In a machine of the type described, in combination, carriage means including positioning means for record carriers mounted on said carriage means for movement along the same, said positioning means being turnable in an inserting direction and in an ejecting direction for transporting record carriers to and from an operative position; transducer head means for recording impulses and for sensing recorded impulses on record carriers transported by said positioning means, said transducer head means being mounted on said positioning means and being movable with the same along said carriage means; storage means for storing impulses; and control circuit means connecting said transducer head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means.

9. In a machine of the type described, in combination, carriage means including positioning means for record carriers, said positioning means being turnable in an inserting direction and in an ejecting direction for transporting record carriers to and from an operative position; transducer head means for recording impulses and for sensing recorded impulses on record carriers transported by said positioning means; storage means for storing impulses including a magnetizable drum turnably mounted on said carriage means and other transducer head means cooperating with said magnetizable drum and mounted on said carriage means; transmission means connecting said positioning means with said drum so that said drum turns with said positioning means, said transmission means including coupling means movable to a first coupling position for effecting stepwise turning of said drum, and to a second coupling position for effecting continuous turning of said drum; and control circuit means connecting said transducer head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means, said control circuit means including electro-magnetic means connected to said coupling means for moving the same to said first coupling position during movement of said positioning means in said inserting direction, and for moving said coupling means to said second coupling position during movement of said positioning means in said ejecting direction.

10. An apparatus as set forth in claim 9 wherein said storage means includes a storage device connected to said other transducer head means; and input means for introducing impulses representing numerical values into said storage device.

11. In a machine of the type described, in combination, carriage means including positioning means for record carriers, said positioning means being movable in an inserting direction and in an ejecting direction for transporting record carriers to and from an operative position; transducer head means for recording impulses and for sensing recorded impulses on record carriers transported by said positioning means, said transducer head means including a set of recording and sensing transducer heads respectively associated with coded digit elements representing decimal digits coded in a binary coded decimal system, and a control head for sensing control impulses; storage means for storing impulses including input and output means for successively storing and transferring numerical values order by order; and control circuit means connecting said transducer head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means, said control circuit means including circuit means connecting said input and output means with said transducer heads.

12. In a machine of the type described, in combination, carriage means including turnable positioning means for record carriers, said positioning means being turnable in an inserting direction and in an ejecting direction for moving record carriers to and from an operative position, said carriage being movable in a stepwise movement; stationary supporting means supporting said carriage means for movement in writing and return directions; transducer head means for recording impulses and for sensing recorded impulses on record carriers transported by said positioning means, said transducer head means including a set of recording and sensing transducer heads respectively associated with coded digit elements representing decimal digits coded in a binary coded decimal system, and a control head for sensing control impulses; storage means for storing impulses including input and output means for successively storing and transferring numerical values order by order; first control means mounted on said carriage means, and second control means mounted on said supporting means and cooperating with said first control means during movement of said carriage means, one of said control means including a plurality of first control elements respectively associated with positions of said carriage means, and the other of said control means including a plurality of second control elements movable to and from an operative position under the control of said first control elements; and control circuit means connecting said head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means, said control circuit means including a set of control switches respectively operated by said second control elements in operative positions, said control circuit means including circuit means connecting said control head with said storage means for actuating said storage means order by order during turning movement of said positioning means, said control circuit means including circuit means connecting said input and output means with said transducer heads.

13. In a machine of the type described, in combination, carriage means including positioning means for record carriers, said positioning means being movable in an inserting direction and in an ejecting direction for transporting record carriers to and from an operative position; a record carrier in said positioning means including a card adapted to receive imprints, and a magnetizable plate substantially smaller than said card and being attached to the same; transducer head means for recording impulses and for sensing recorded impulses on record carriers transported by said positioning means; storage means for storing impulses; and control circuit means connecting said transducer head means with said storage means for effecting during movement of said positioning means in said inserting direction sensing of impulses recorded on a record carrier moved by said positioning means and storing of said impulses in said storage means, and for effecting during movement of said positioning means in said ejecting direction recording of impulses stored in said storage means on a record carrier moved by said positioning means.

14. An arrangement as set forth in claim 13, wherein said magnetizable plate is adhesively and detachably attached to said card to permit removal of said plate and attachment of the same to another face of said card, or to another card.

15. In an accounting machine, in combination, carriage means including positioning means for transporting an account card having a magnetizable portion to and from an operative position; stationary supporting means supporting said carriage means for movement in writing and return directions; transducer head means cooperating with said magnetizable portion and being mounted on said carriage means in the region of said positioning means; storage means for storing impulses; input means for introducing impulses representing numerical values into said storage means; first control means mounted on said carriage means and including a plurality of first control elements respectively associated with positions of said carriage means; second control means on said supporting means and including a set of second control elements movable to and from an operative position under control of said first control elements during movement of said carriage means; a set of switches operated by said second control elements in operative positions; printing means mounted on said support means for printing on account cards held by said positioning means in operative position; electromagnetic means for operating said printing means; and control circuit means including circuit means connecting said transducer head means with said storage means for effecting during movement of said positioning means sensing of impulses recorded on said magnetizable portion of an account card transported by said positioning means and storing of said impulses in said storage means, and for effecting recording of impulses stored in said storage means on said magnetizable portion of a transported account card, said circuit means including selected switches of said switches, said control circuit means including other circuit means connecting said electromagnetic means with other selected switches of said switches so that said printing means are actuated during movement of said carriage means.

16. In an accounting machine, in combination, carriage means including turnable positioning means for transporting an account card having a magnetizable portion to and from an operative position; stationary supporting means supporting said carriage means for movement in writing and return directions; transducer head means cooperating with said magnetizable portion and being mounted on said carriage means in the region of said positioning means; storage means for storing impulses and including a storage drum having a magnetizable surface and being mounted for turning movement on said carriage means; other transducer head means spaced in circumferential and axial directions of said storage drum for recording impulses and for sensing impulses on said surface of the same; transmission means including a coupling means having a first coupling position for connecting said storage drum for turning movement with said positioning means and having a second coupling position for connecting said storage drum to said carriage means for stepwise movement with the same; electromagnetic shifting means for moving said coupling means between said coupling positions; input means for introducing impulses representing numerical values into said storage means; first control means mounted on said carriage means and including a plurality of first control elements respectively associated with positions of said carriage means; second control means on said supporting means and including a set of second control elements movable to and from an operative position under control of said first control elements during movement of said carriage means; a set of switches operated by said second control elements in operative positions; printing means mounted on said support means for printing on account cards held by said positioning means in operative position; electromagnetic means for operating said printing means; and control circuit means including circuit means connecting said transducer head means with said storage means for effecting during movement of said positioning means sensing of impulses recorded on said magnetizable portion of an account card transported by said positioning means and storing of said impulses in said storage means, and for effecting recording of impulses stored in said storage means on said magnetizable portion of a transported account card, said circuit means including selected switches of said switches, said control circuit means including other circuit means connecting said electromagnetic means with other selected switches of said switches so that said printing means are actuated during movement of said carriage means, said control circuit means including further circuit means connecting selected further switches of said switches with said electromagnetic shifting means so that during movement of said carriage means in one direction said storage drum is moved in a stepwise movement and so that during movement of said carriage means in the opposite direction said storage drum continuously turns with said positioning means.

17. An apparatus as set forth in claim 16 and including motor means for turning said positioning means; and circuit means connected to said motor means and including reversing switches for reversing the direction of rotation of said motor means and being controlled by said carriage means so that said positioning means turns in opposite directions during movement of the carriage means in said writing and return directions.

18. In an accounting machine, in combination, carriage means including positioning means for transporting an account card having a magnetizable portion to and from an operative position; stationary supporting means supporting said carriage means for movement in writing and return directions; transducer head means cooperating with said magnetizable portion and being mounted on said carriage means in the region of said positioning means, said transducer head means including a set of transducer heads for recording and sensing impulses on said magnetizable portion coded in accordance with a binary coded decimal system, and a control head for sensing permanently recorded control impulses on said magnetizable portion of said account card; storage means for storing impulses; stepping means for actuating said storage means order by order and being electrically connected to said control head so that a different order of said storage means is actuated whenever said control head senses a different control impulse on said magnetizable portion during transporting movement of said positioning means; input means for introducing impulses representing numerical values into said storage means; first control means mounted on said carriage means and including a plurality of first control elements respectively associated with positions of said carriage means; second control means on said supporting means and including a set of second control elements movable to and from an operative position under control of said first control elements during movement of said carriage means; a set of switches operated by said second control elements in operative positions; printing means mounted on said support means for printing on account cards held by said positioning means in operative position; electromagnetic means for operating said printing means; and control circuit means including circuit means connecting said transducer head means with said storage means for effecting during movement of said positioning means sensing of impulses recorded on said magnetizable portion of an account card transported by said positioning means and storing of said impulses in said storage means, and for effecting recording of impulses stored in said storage means on said magnetizable portion of a transported account card, said circuit means including selected switches of said switches, said control circuit means including other circuit means connecting said electromagnetic means with other selected switches of said switches so that said printing means are actuated during movement of said carriage means.

19. An apparatus as set forth in claim 18 and including motor means for turning said positioning means; and circuit means connected to said motor means and including reversing switches for reversing the direction of rotation of said motor means and being controlled by said carriage means so that said positioning means turns in opposite directions during movement of the carriage means in said writing and return directions.

20. In a machine of a type described, in combination, carriage means including positioning means movable in an inserting direction and in an ejecting direction for transporting record carriers to and from a printing position; head means for recording impulses, and for sensing recorded impulses on a magnetizable portion of record carriers transported by said positioning means, said head means being mounted on said positioning means; means for printing on the record carriers; storage means for storing impulses; input means for introducing data into said storage means; means for actuating said printing means to print data introduced by said input means into said storage means; and means connecting said head means with said storage means for effecting sensing of impulses recorded on a record carrier moved by said positioning means in said inserting direction and storing of the sensed impulses in said storage means, and for effecting recording of impulses stored in said storage means on a record carrier moved by said positioning means in said ejecting direction.

References Cited in the file of this patent

UNITED STATES PATENTS

| | | |
|---|---|---|
| 2,046,082 | Mills | June 30, 1936 |
| 2,158,749 | Elliott | May 16, 1939 |
| 2,254,931 | Bryce | Sept. 2, 1941 |
| 2,258,106 | Bryce | Oct. 7, 1941 |
| 2,364,758 | Roggenstein | Dec. 12, 1944 |
| 2,708,267 | Weidenhammer | May 10, 1955 |

FOREIGN PATENTS

| | | |
|---|---|---|
| 393,763 | Canada | Jan. 7, 1941 |
| 1,101,201 | France | Apr. 20, 1955 |
| 1,114,901 | France | Dec. 26, 1955 |
| 783,586 | Great Britain | Sept. 25, 1957 |